United States Patent
Vidal et al.

(10) Patent No.: US 11,755,919 B2
(45) Date of Patent: Sep. 12, 2023

(54) ANALYTICS FOR AN AUTOMATED APPLICATION TESTING PLATFORM

(71) Applicant: Sauce Labs Inc., San Francisco, CA (US)

(72) Inventors: Fernando Vidal, Oakland, CA (US); Christian Bromann, Berlin (DE); Bradley Scott Adelberg, Portola Valley, CA (US); Robert Henrikson, Oakland, CA (US); Jean Sandberg, Alameda, CA (US)

(73) Assignee: Sauce Labs Inc., San Francisco, CA (US)

(*) Notice: Subject to any disclaimer, the term of this patent is extended or adjusted under 35 U.S.C. 154(b) by 1114 days.

(21) Appl. No.: 15/973,019

(22) Filed: May 7, 2018

(65) Prior Publication Data

US 2019/0340512 A1 Nov. 7, 2019

(51) Int. Cl.
*G06N 3/088* (2023.01)
*G06F 11/36* (2006.01)

(52) U.S. Cl.
CPC ......... *G06N 3/088* (2013.01); *G06F 11/3664* (2013.01); *G06F 11/3684* (2013.01); *G06F 11/3688* (2013.01); *G06F 11/3692* (2013.01)

(58) Field of Classification Search
CPC . G06N 3/088; G06F 11/3664; G06F 11/3684; G06F 11/3688; G06F 11/3692; G06F 11/36–3696
See application file for complete search history.

(56) References Cited

U.S. PATENT DOCUMENTS

| 8,566,648 | B2 | 10/2013 | Schroeder | |
|---|---|---|---|---|
| 8,856,748 | B1 | 10/2014 | Larsen et al. | |
| 9,069,904 | B1* | 6/2015 | Cohen | G06F 11/3672 |
| 9,075,914 | B2 | 7/2015 | Huggins | |
| 9,170,847 | B2 | 10/2015 | Huggins et al. | |
| 10,445,221 | B2 | 10/2019 | Bromann et al. | |
| 10,942,837 | B2 | 3/2021 | Vidal et al. | |
| 11,042,472 | B2 | 6/2021 | Vidal et al. | |
| 2006/0212540 | A1* | 9/2006 | Chon | G06F 11/261 |
| | | | | 714/E11.167 |
| 2007/0050677 | A1* | 3/2007 | Klamik | G06F 11/3688 |
| | | | | 714/47.2 |

(Continued)

FOREIGN PATENT DOCUMENTS

DE 10 2012 223 587 7/2014
EP 3 193 257 A1 7/2017

OTHER PUBLICATIONS

Luo, Qingzhou, et al. "An empirical analysis of flaky tests." Proceedings of the 22nd ACM SIGSOFT international symposium on foundations of software engineering. 2014. (Year: 2014).*

(Continued)

*Primary Examiner* — Kevin L Young
*Assistant Examiner* — Joanne G Macasiano
(74) *Attorney, Agent, or Firm* — Weaver Austin Villeneuve & Sampson LLP

(57) ABSTRACT

Machine learning techniques are employed to model test runs of an automated test platform in ways that allow for reliable identification of various types of test behavior such as, for example, whether certain classes of failures can be characterized as test flake.

24 Claims, 6 Drawing Sheets

(56) References Cited

U.S. PATENT DOCUMENTS

| | | | | |
|---|---|---|---|---|
| 2011/0289489 | A1* | 11/2011 | Kumar | G06F 11/3688 |
| | | | | 717/135 |
| 2015/0169434 | A1* | 6/2015 | De Angelis | G06F 11/3664 |
| | | | | 717/126 |
| 2016/0062879 | A1 | 3/2016 | Tan et al. | |
| 2017/0017566 | A1* | 1/2017 | Lundstrom | G06F 11/3672 |
| 2017/0286258 | A1* | 10/2017 | Coulthard | G06F 11/3608 |
| 2018/0300609 | A1* | 10/2018 | Krishnamurthy | G06N 3/044 |
| 2019/0065357 | A1* | 2/2019 | Brafman | G06F 11/3692 |
| 2020/0019490 | A1 | 1/2020 | Bromann et al. | |
| 2020/0183821 | A1* | 6/2020 | Qin | G06F 11/3692 |

OTHER PUBLICATIONS

Gao, Zebao. Quantifying flakiness and minimizing its effects on software testing. Diss. University of Maryland, College Park, 2017. (Year: 2017).*

Memon, Atif M., and Myra B. Cohen. "Automated testing of GUI applications: models, tools, and controlling flakiness." 2013 35th International Conference on Software Engineering (ICSE). IEEE, 2013. (Year: 2013).*

Stewart, et al., "WebDriver: W3C Candidate Recommendation," https://w3c.github.io/webdriver/webdriver-spec.html, Feb. 14, 2018, 154 pages.

U.S. Appl. No. 15/916,136, filed Mar. 8, 2018, Bromann et al.

PCT International Search Report and Written Opinion dated Jun. 20, 2019, issued in Application No. PCT/US2019/020070.

PCT International Preliminary Report on Patentability dated Nov. 10, 2020, issued in Application No. PCT/US2019/020070.

* cited by examiner

```
[{"screenshot": 0, "between_commands": null, "suggestion_values": [],
"request": {"desiredCapabilities": {"takesScreenshot": true,
"chromeOptions": {"binary": "D:\\Program Files\\Chrome 64\\
64.0.3282.119\\chrome.exe", "args": ["start-maximized", "disable-webgl",
"blacklist-webgl", "blacklist-accelerated-compositing", "disable-
accelerated-2d-canvas", "disable-accelerated-compositing", "disable-
accelerated-layers", "disable-accelerated-plugins", "disable-accelerated-
video", "disable-accelerated-video-decode", "disable-gpu", "disable-
infobars", "test-type", "disable-extensions"]}, "browserName": "chrome",
"proxy": {"proxyAutoconfigUrl": "http://127.0.0.1:19876/pac.js",
"proxyType": "PAC"}, "platformVersion": "latest", "platformName":
"MAC"}}, "HTTPStatus": 200, "result": {"takesScreenshot": true,
"acceptSslCerts": false, "networkConnectionEnabled": false,
"mobileEmulationEnabled": false, "unexpectedAlertBehaviour": "",
"applicationCacheEnabled": false, "locationContextEnabled": true,
"rotatable": false, "acceptInsecureCerts": false, "hasTouchScreen":
false, "platform": "Windows NT", "version": "64.0.3282.119",
"nativeEvents": true, "handlesAlerts": true, "takesHeapSnapshot": true,
"javascriptEnabled": true, "databaseEnabled": false, "browserName":
"chrome", "webStorageEnabled": true, "browserConnectionEnabled": false,
"cssSelectorsEnabled": true, "chrome": {"chromedriverVersion":
"2.35.528161 (5b82f2d2aae0ca24b877009200ced9065a772e73)", "userDataDir":
"C:\\Users\\ADMINI~1\\AppData\\Local\\Temp\\scoped_dir1772_2525"},
"setWindowRect": true, "pageLoadStrategy": "normal"}, "suggestion": null,
"duration": 0.7799999713897705, "path": "/session", "method": "POST",
"statusCode": 0}, {"screenshot": 1, "between_commands":
1.5480000972747803, "suggestion_values": [], "request": {"url": "http://
dev.uisdk.awm.uk.intranet.db.com/catalogue-release/ui/feature-yomi-test/
#/components/localisation/numbers"}, "HTTPStatus": 200, "result": null,
"suggestion": null, "duration": 4.944999933242798, "path": "url",
"method": "POST", "statusCode": 0}, {"screenshot": null,
"between_commands": 0.28799986839294434, "suggestion_values": [],
"request": {"type": "implicit", "ms": 2000}, "HTTPStatus": 200, "result":
null, "suggestion": null, "duration": 0.004000186920166016, "path":
"timeouts", "method": "POST", "statusCode": 0}, {"screenshot": null,
"between_commands": 0.22799992561340332, "suggestion_values": [],
"request": {}, "HTTPStatus": 200, "result": "http://
dev.uisdk.awm.uk.intranet.db.com/catalogue-release/ui/feature-yomi-test/
#/components/localisation/numbers", "suggestion": null, "duration":
0.006999969482421875, "path": "url", "method": "GET", "statusCode": 0},
{"screenshot": 2, "between_commands": 0.19900012016296387,
"suggestion_values": [], "request": {"args": [], "script": "return
(typeof jQuery === 'function')"}, "HTTPStatus": 200, "result": false,
"suggestion": null, "duration": 0.006999969482421875, "path": "execute",
"method": "POST", "statusCode": 0}, {"screenshot": 3, "between_commands":
0.7669999599456787, "suggestion_values": [], "request": {"args": [],
"script": "/*! jQuery v1.8.3 jquery.com | jquery.org/license */\
n(function(e,t){function _(e){var t=M[e]={};return
v.each(e.split(y),function(e,n){t[n]=!0}),t}function
H(e,n,r){if(r===t&&e.nodeType===1){var ...
```

FIG. 5

| Idx | command | url | using | value | result_parsed |
|---|---|---|---|---|---|
| 0 | POST /session | | | | SESSION_DATA |
| 1 | POST url | http://dev.usdk.awm.uk.intranet.db.com/catalo... | | | |
| 2 | POST timeouts | | | | |
| 3 | GET url | | | | http://dev.usdk.awm.uk.intranet.db.com/catalo... |
| 4 | POST execute | | | | FALSE |
| 5 | POST execute | | | | |
| 6 | POST execute | | | | |
| 7 | POST elements | | CSS selector | #app.catalogue.props-editor | FOUND_8_ELEMENTS |
| 8 | GET element/<ELEMENTID>/displayed | | | | TRUE |
| 9 | GET element/<ELEMENTID>/data-test-id | | | | basic-number-props-editor |
| 10 | GET element/<ELEMENTID>/data-test-id | | | | currency-props-editor |
| 11 | GET element/<ELEMENTID>/data-test-id | | | | percent-props-editor |

*FIG. 6*

ANALYTICS FOR AN AUTOMATED APPLICATION TESTING PLATFORM

BACKGROUND

The testing of software applications has become a critical bottleneck in the pipeline between developers and end users. The diversity of devices, operating systems, and web browsers, coupled with the rapid pace at which new versions of each become available, makes it extremely difficult to ensure compatibility and reliable operation of a new application with a significant portion of the possible combinations in a timely manner.

Cloud-based automated testing platforms address some of these issues by enabling a high degree of parallelism in testing an application using various combinations of virtual and hardware resources. However, a persistent issue for developers relates to determining whether inconsistent test results represent real problems. For example, test failures might relate to intermittent network latency issues rather than the logic of the application under test and so might be safely ignored. Such failures are characterized as what is commonly referred to as "test flake," i.e., inconsistent or non-deterministic pass/fail behavior of a given test even though neither the test nor the application being tested has changed. Dealing with test flake represents a significant expenditure of troubleshooting resources and often results in arbitrary solutions, e.g., labeling something a failure only if it fails in some arbitrary way.

SUMMARY

According to various implementations, methods, systems, apparatus, and computer program products are provided that model test runs in ways that allow for reliable identification of various types of test behavior. A plurality of training test runs are performed for an application under test (AUT). Each training test run involves execution of test code against a corresponding instance of the AUT. Each training test run results in corresponding training test results. The training test results for each training test run are simplified by removing noisy information from the training test results. A training test run representation is generated for each of the training test runs using the corresponding simplified training test results. The training test run representations are clustered into a plurality of test run clusters. Each of a subset of the test run clusters is identified as representing training test runs exhibiting inconsistent failure behavior. A first test run is performed for the AUT by executing the test code against a corresponding instance of the AUT, thereby generating first test results. The first test results are simplified by removing noisy information from the first test results. A first test run representation is generated using the simplified first test results. It is determined that the first test run representation corresponds to a first one of the subset of test run clusters. The first test run is labeled with a reliability label representing the inconsistent failure behavior.

According to a class of implementations, the clustering of the training test run representations is done using an unsupervised learning technique.

According to another class of implementations, one of a plurality of labels is associated with each of the training test run representations. The clustering of the training test run representations is done using the labels and a supervised learning technique. According to a more specific implementation, representations of the training test results are transmitted to a remote developer device for presentation in a user interface of the remote developer device. Feedback is received from the remote developer device. The feedback is generated using the user interface and relates to the training test results. Associating the labels with the training test run representations is done based on the feedback.

According to another class of implementations, the AUT is a web application, and each of the first and training test runs involves interaction of a web browser with the corresponding instance of the AUT as controlled by the test code using a web application automation driver. Each of the first and training test results corresponds to a test log representing application of test commands of the test code using the web application automation driver.

According to another class of implementations, the AUT is a native application configured to operate with a mobile device operating system (OS), and each of the first and training test runs involves interaction of the test code with the corresponding instance of the AUT using a mobile device automation driver. Each of the first and training test results corresponds to a test log representing application of test commands of the test code using the mobile device automation driver.

According to another class of implementations, each of the first and training test results includes state information for the corresponding test run. The state information is collected for each of the first and training test runs using a control/capture service (CCS) that is independent of the test code. The state information for each test run represents one or more states associated with one or more testing resources allocated for the test run. According to a specific implementation, the AUT is a web application, and each of the first and training test runs involves interaction of a web browser with the corresponding instance of the AUT as controlled by the test code. The state information includes a state of the web browser, and the CCS is configured to apply control commands to the web browser and to receive the state of the web browser from the web browser via an application programming interface associated with the web browser. According to another specific implementation, the AUT is a native application configured to operate with a mobile device operating system (OS), and each of the first and training test runs involves interaction of the test code with the corresponding instance of the AUT. The state information includes one or more of a state of the native application, a state of the mobile device OS, or a state of an emulator emulating the mobile device OS.

According to another class of implementations, for each of the first and training test runs: A request is received for initiation of the test run. One or more resources are allocated for the test run. The one or more resources include a virtual computing environment (VCE) instance. A communication link is established between the VCE instance and the corresponding instance of the AUT. A plurality of test commands resulting from execution of the test code is received. The test commands are applied to the corresponding instance of the AUT using the VCE instance and the communication link. The test results for the test run are received with the VCE instance via the communication link. The test commands and the test results are correlated thereby generating a correlated data set. The correlated data set is stored.

According to another class of implementations, a second test run is performed for the AUT by executing the test code against a corresponding instance of the AUT, thereby generating second test results. The second test results are simplified by removing noisy information from the second test results. A second test run representation is generated using the simplified second test results. It is determined that the second test run representation does not correspond to any of the test run clusters. The second test run is labeled as a new type of failure.

According to another class of implementations, a second test run is performed for the AUT by executing the test code against a corresponding instance of the AUT, thereby generating second test results. The second test results are simplified by removing noisy information from the second test results. A second test run representation is generated using the simplified second test results. It is determined that the second test run representation does not correspond to any of the test run clusters. A new cluster including the second test run representation is formed.

A further understanding of the nature and advantages of various implementations may be realized by reference to the remaining portions of the specification and the drawings.

BRIEF DESCRIPTION OF THE DRAWINGS

FIG. 5 shows an example of raw log data for a test run.

FIG. 6 shows an example of preprocessed log data generated from the raw log data of FIG. 5.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes various implementations in which machine learning techniques are employed to model test runs in ways that allow for reliable identification of various types of test behavior such as, for example, whether certain classes of failures can be characterized as test flake and so can be safely ignored or assigned lower weights. These techniques also allow for the identification of test flake as well as new modes of failure that should potentially be given greater significance.

Examples of specific implementations are described in the context of an automated testing platform configured to capture a rich, time-correlated information set during automated testing of an application in a way that allows the application developer to understand the state of the application under test (AUT), the browser interacting with the AUT, and/or the virtual resources or devices interacting with the AUT, as it and/or how any of these changed over time, and to therefore have a deeper understanding of test results. At least some of these capabilities are supported by various mechanisms associated with browsers and/or device operating systems that are exploited to capture such information in parallel with the automated testing. However, it should be noted that implementations enabled by the present disclosure are not limited to use with such advanced capabilities. The scope of the present disclosure should therefore not be limited by reference to these examples.

Figure 1:
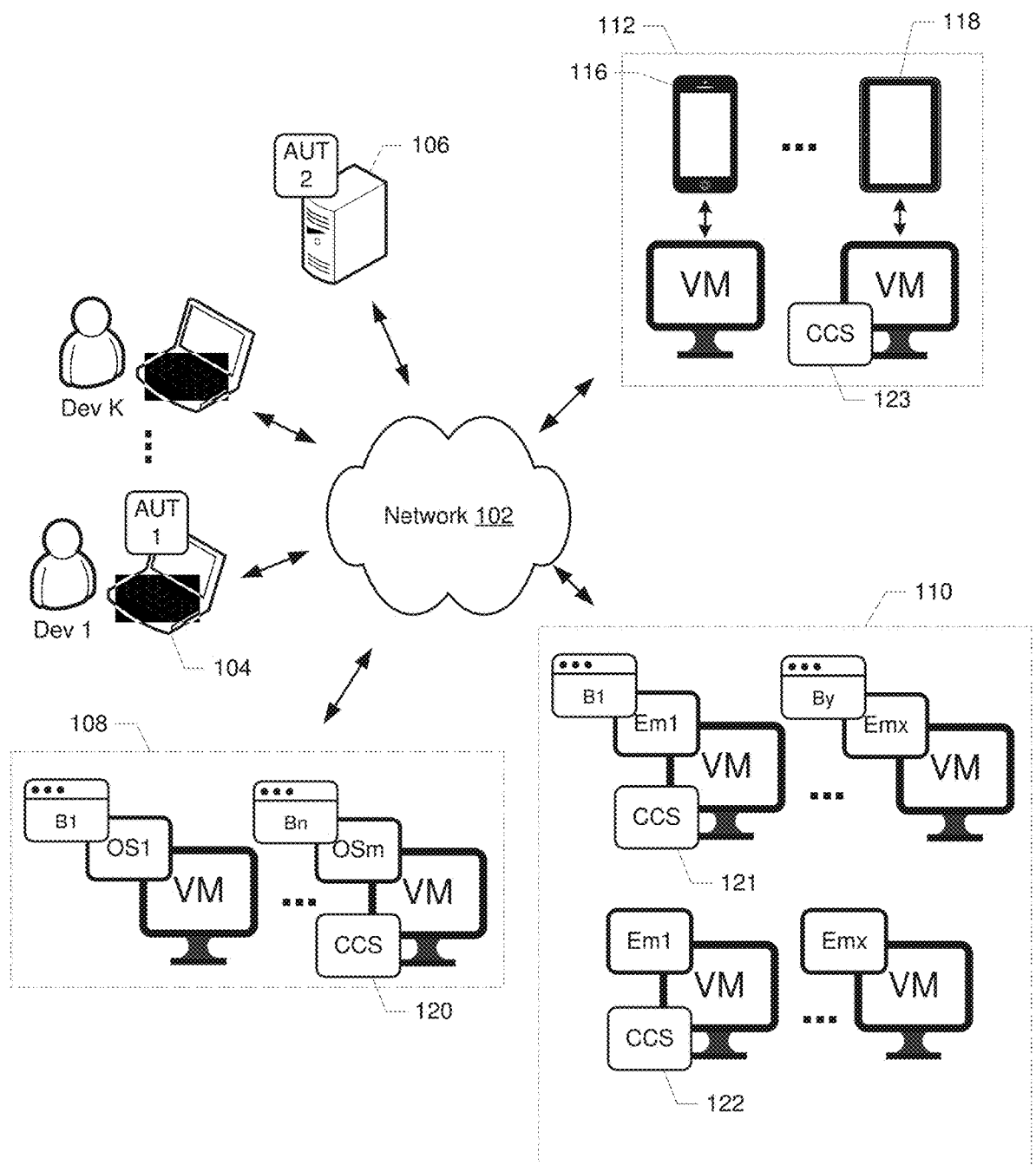
FIG. 1 is a simplified diagram of a computing system in which implementations enabled by the present disclosure may be practiced.

FIG. 1 depicts a computing environment in which application developers test their applications using resources on a cloud-hosted testing platform via network 102. Developers Dev 1 through Dev K represent a diverse community that may include anything from an individual developer on a single laptop to a team of developers on a WAN at a large enterprise. The AUTs may reside on the same machine with which the developer is interacting with the test platform (e.g., as represented by AUT 1 on laptop 104), or on a separate machine (e.g., as represented by AUT 2 on server 106). The AUTs may be hosted in the public cloud with minimal security, or behind the enterprise-grade security of an enterprise network.

The virtual and hardware resources of the application testing platform are depicted in FIG. 1 as being include in resource pools 108-112. Resource pool 108 represents resources for testing web applications on potentially hundreds of browser and operating system (OS) combinations as represented by various combinations of browsers B1-Bn and operating systems OS1-OSm on corresponding virtual machine (VM) instances. These VM instances may represent, for example, Windows, Mac, and Linux-based machines to name some representative examples.

Resource pool 110 represents resources for testing mobile web applications on potentially hundreds of mobile browser and mobile device emulator combinations as represented by various combinations of mobile browsers B1-By and emulators Em1-Emx on corresponding VM instances. Resource pool 110 also represents resources for testing native mobile applications on potentially hundreds of mobile device emulators as represented by emulators Em1-Emx on corresponding VM instances. The depicted emulators may represent, for example, iOS Simulators and Android Emulators to name some representative examples. And while the emulators are shown as operating on corresponding VMs, the developer will typically primarily interact with or automate on the emulators.

Resource pool 112 represents resources for testing both mobile web applications and native mobile applications on potentially hundreds of hardware mobile device types as represented by smart phone 116 and tablet 118 and the corresponding VM instances that manage the interaction with a corresponding mobile device during testing. The depicted devices may represent, for example, physical phones or tablets for Android and iOS to name some representative examples.

It should be noted that the test platform of FIG. 1 and other examples described herein show the use of VMs for exemplary purposes. It will be understood that other mechanisms for providing isolation among applications operating in a shared computing environment are contemplated to be within the scope of the present disclosure. Such other mechanisms include, for example, containers such as those provided by Docker, Inc., or CoreOS, Inc., both of San Francisco, Calif. The present disclosure will refer generally to VMs, containers, and other suitable mechanisms for providing isolation among applications in a computing environments as "virtual computing environment instances" or "VCEs." The present disclosure should therefore not be limited by reference to specific examples using VMs.

The platform depicted in FIG. 1 supports a wide range of application testing use cases. A single developer might use the platform to manually run a single test of an AUT with one combination of testing resources. At the other end of the scale, a team of developers associated with a large enterprise can implement an automated testing framework at scale, running multiple tests of multiple AUTs on many different combinations of testing resources simultaneously. And depending on the AUT and the goals of a particular test, there may be one or many instances of the AUT with which the platform interacts for that test. And as will be discussed, the platform may include control/capture services (e.g., CCS's 120-123 operating on respective VMs) that are capable of connecting with, exerting varying degrees of control over, and/or capturing state information from the platform's testing resources and/or the AUTs for correlation with other test-related information.

As will be appreciated, the depiction of resource pools 108-112 is for illustrative purposes. More generally, the application testing platform may conform to any of a wide variety of architectures including, for example, one or more platforms deployed at one or more co-locations, each implemented with one or more servers. Network 102 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. The computing devices with which developers connect to the testing platform may be any suitable device capable of connecting to network 102 and interacting with the testing resources.

Some implementations enabled by the present disclosure are based on computing models that enable ubiquitous, convenient, on-demand network access to both virtual and hardware resources from one or more shared pools of computing resources (e.g., mobile devices, virtual machines, containers, emulators, networks, servers, storage, applications, services, etc.). Virtual resources are thoroughly torn down or wiped and hardware resources thoroughly wiped once testing is complete to ensure the security of each developer's data. As will be understood, such computing resources may be integrated with and/or under the control of the same entity controlling the testing platform. Alternatively, such resources may be associated with other platforms that are at least partially controlled by other entities, e.g., a platform under control of a separate provider of cloud services and/or computing resources with which the testing platform and/or the developer connects to consume resources as needed. In another example, a developer or an enterprise might run their own cloud or cluster of computing devices such as, for example, a Kubernetes cluster, the documentation for which is distributed by the Linux Foundation®. The diversity of other variations within the scope of this disclosure will be appreciated by those of skill in the art.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

Figure 2:
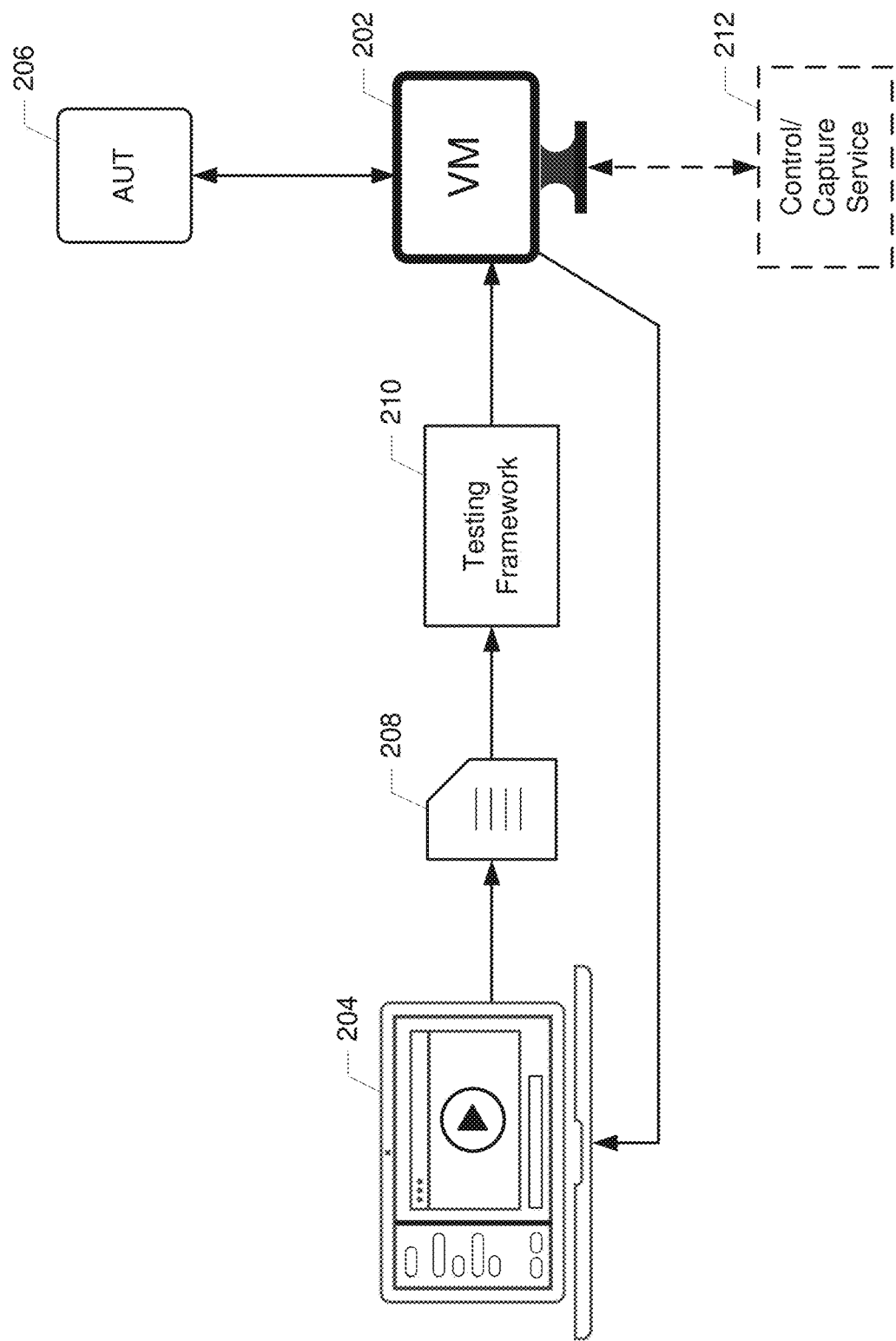
FIG. 2 illustrates interactions between a software developer and an application testing platform.
Figure 3:
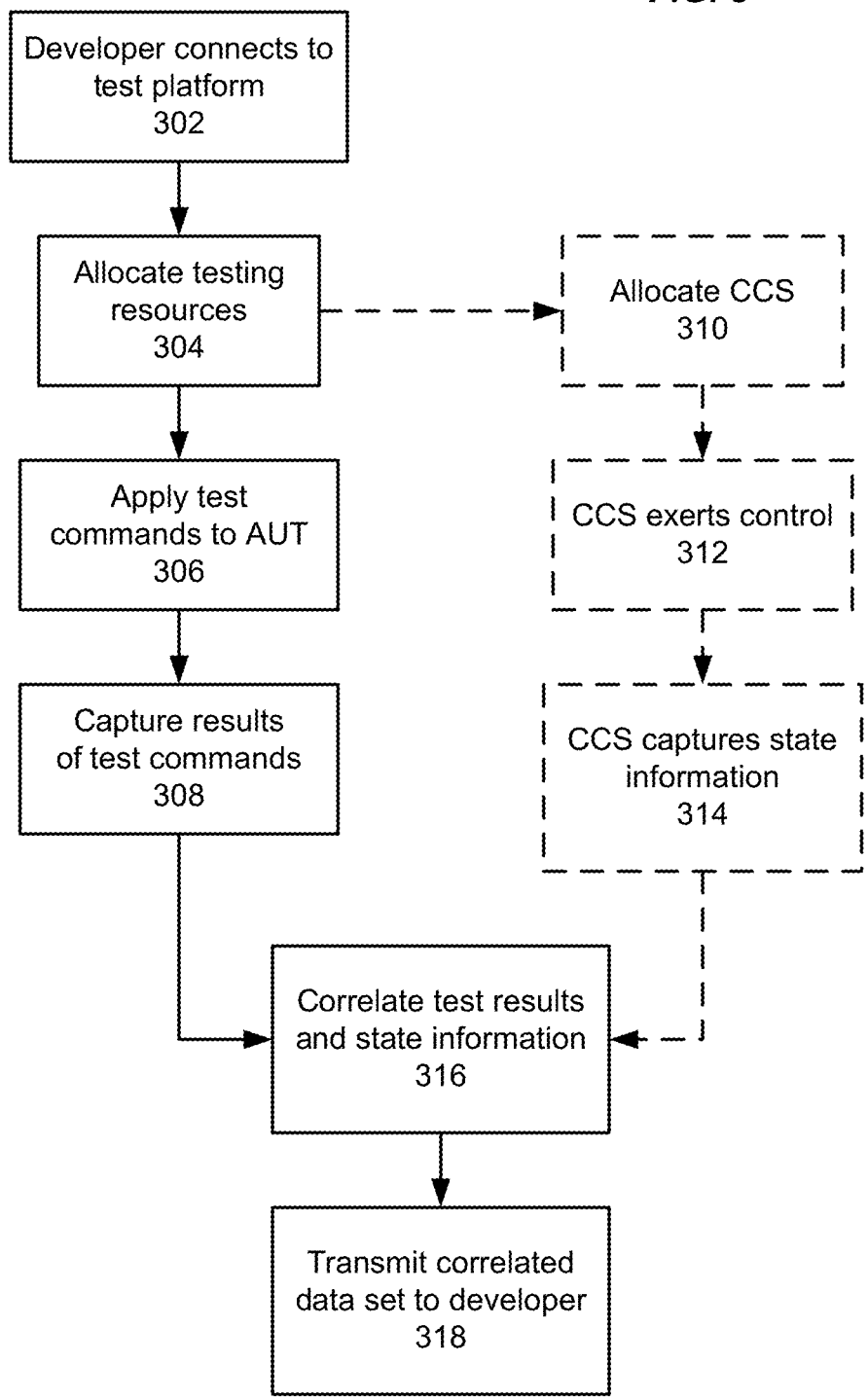
FIG. 3 is a flowchart illustrating operation of a particular implementation.

Referring now to the diagram of FIG. 2 and the flowchart of FIG. 3, a developer interacts with test resource(s) 202 (depicted in FIG. 2 as a VM instance) of a remote testing platform (302) via a test console interface (e.g., a web interface) on laptop 204 in which the developer can select the types of resource(s) with which an AUT 206 is to be tested. In response to the developer's selections, test resources 202 are allocated to that developer's test(s) (304). Interaction with test resources 202 may also be facilitated via a programmatic interface, e.g., a REST interface, (not shown) that might be used, for example, in the context of large-scale, automated testing. The developer develops test script 208 for the AUT in any of a variety of common languages (e.g., Ruby, PHP, JavaScript, or .NET), and the test commands are applied to AUT 206 (306) via VM instance 202 using any of a variety of automation software and/or testing frameworks (e.g., 210) including, for example, various automation drivers, Selenium and WebDriver for web application testing, and Appium, Espresso, XCUItest (Xcode), and Robotium for mobile application testing, etc.

The test scripts may be run on the developer's machine/network, on a remote machine (e.g., a continuous integration/continuous development (CI/CD) system), or by a remote service. The resulting commands are sent to the selected resources via a secure, two-way proxy server connection (e.g., a secure HTTP tunnel). There is also a secure two-way connection via proxy server from the selected testing resources to the AUT, wherever that resides. For example, if the AUT is a web application, VM instances with various browser/OS combinations specified by the developer are allocated from a pool or, if not available, instantiated. Secure HTTP tunnels to both the developer's machine and the AUT are established for each VM. Selenium commands generated by the developer's test script are applied (e.g., via an external driver) to each browser via one tunnel, and the browser then interacts with the AUT in a corresponding way via the other tunnel. As will be appreciated, while the use of highly secure connections may be preferable in some circumstances, implementations are contemplated in which different levels of security are used.

The results of the application of the test commands are captured (308) for eventual transmission back to the developer's device or network (as described below) for reviewing and/or further processing, e.g., via the test console interface. The captured test results may include the commands and responses (e.g., Selenium or Appium logs), as well as video or screen shots of the browser UI and/or AUT after each page-altering command. These results are correlated in time and stored (e.g., in cloud storage such as Amazon's Simple Store Service (S3) buckets) before the VM instance and any other resources are torn down or wiped. As discussed below, these test results may be supplemented with additional information captured via another connection.

According to some implementations, and as illustrated in FIG. 2, a CCS 212 may be allocated (310) that interacts with one or more of the AUT and/or the allocated testing resources (e.g., the VM instance, container, browser, OS, emulator, mobile device, etc.) via another two-way connection to exercise control over (312) and/or capture information from (314) the testing resource(s) in a way that does not significantly interfere with the test(s) being conducted. For the purpose of clarity, CCS 212 is shown in the figure as being distinct from VM instance 202. However, it should be noted that, while such implementations are contemplated, implementations are also contemplated in which CCS 212 operates on the VM instance. It should also be noted that implementations are contemplated in which a CCS or its equivalent is not present or involved. The optional nature of the CCS is represented by dashed lines in both FIGS. 2 and 3. Examples of the kinds of information that might be generated using a CCS follow.

One example assumes that the AUT is a web application, that the testing resource of the testing platform is a particular browser/OS combination operating on a VM instance, and that the testing framework is an open source framework using a Selenium library. It will be understood however that these assumptions are merely for the purpose of illustration. For example, other examples might employ frameworks that don't need to use a Selenium library such as, for example, any framework based on WebDriver, an interface that enables the remote control of web browsers as described in W3C Candidate Recommendation 14 Feb. 2018, the entire disclosure of which is incorporated herein by reference for all purposes. It should also be noted that, while only one test instance is shown, the described interactions among the components of the test system may be performed substantially simultaneously at scale across many test instances.

As will be appreciated, there is a significant amount of traffic between a browser and the servers with which it interacts, e.g., communications with remote assets via REST calls initiated by JavaScript embedded in the page html. Browsers like Internet Explorer from Microsoft, Chrome from Google, Firefox from Mozilla, and Safari from Apple have associated application programming interfaces (APIs) that enable debugging functionality (e.g., using developer tools) and execution of automation commands (e.g., by automation drivers such as ChromeDriver or Geckodriver).

Developer tools provide visibility on various browser communications and other performance data that can be accessed via a developer tools menu, e.g., by right-clicking on a page and selecting "Inspect" or "Inspect element." For example, a "Console" view provides a running list of requests (e.g., actions taken, links selected, etc.) and associated errors. In another example, a "Performance" view provides information about the use of various resources (e.g., network bandwidth, memory, CPU, etc.). Such "dev tools" are used by web developers to test and troubleshoot the pages of a web site under development. However, the use of these tools is typically limited to local testing by one developer using one browser on one web page at a time. Moreover, acquisition of the various types of information available through the dev tools menu is typically achieved through manual inspection by the developer. The test platform described above allows developers to perform tests of applications on many different browser/OS combinations simultaneously. However, as will be appreciated, this type of large-scale testing does not lend itself to the conventional, manual use of dev tools.

Conventional browser testing involves the execution of commands within a browser using, for example, an open source framework and the appropriate automation driver. In conjunction with this, and without interfering with the application of the test commands, a control/capture service (e.g., CCS 212) may be used to connect to the browser over a TCP interface that is defined in the dev tools protocol of the browser, control use of the tools in specified ways, and capture information for correlation with the information in the test logs and/or screen shots or video of the browser interface. The information captured can relate to any of the information generated or made accessible by the browser engine (e.g., Blink for Chrome or Gecko for Firefox) using the dev tools interface defined by the dev tools protocol, e.g., back-end calls and responses, browser performance, memory usage, security audits, DOM tree snapshots, etc. The information captured can also include information made available by the VM or container itself such as, for example, CPU or memory usage, traffic across the NIC, etc. That is, in addition to conventional (e.g., Selenium-based) testing, a CCS allows the developer to access browser features or VM/container information in an automated way that allows more customized control of the browser or VM/container, and the collection of a much richer information set in connection with the tests being executed.

As described above, web browser specifications provide for establishing high-level two-way interfaces for automating interaction with the browser using external drivers. A testing framework based on WebDriver uses such interfaces to apply test commands. Such interfaces allows for integration with the dev tools using such a two-way interface, e.g., the Chrome DevTools Protocol from Google allows for tools to instrument, inspect, debug, and profile Chrome browsers. Instrumentation is divided into a number of domains (e.g., DOM, debugger, network, etc.), each of which defines a number of commands it supports and events it generates. Similarly, the Mozilla debugging protocol allows an external service to connect to a Firefox browser, discover what sorts of things are present for debugging or inspection, select JavaScript threads to watch, and observe and modify their execution. The protocol provides a unified view of JavaScript, DOM nodes, CSS rules, and the other technologies used in web applications.

For older browser versions that only allow one connection to the internal browser debugging interface, a time-based multiplexer may be employed to allow WebDriver test commands and the control/capture service communications to occur during the same test. More current browser versions that allow multiple simultaneous driver connections do not require this.

The connection via the browser's API may be a two-way connection that allows the developer to control the browser in an automated way, e.g., to enable or disable specific browser functionality in conjunction with the tests they design (Selenium-based or otherwise). This may be done, for example, with a set of controls specified on the developer's test console interface that are then imposed in parallel with the tests at scale across all relevant browser/OS combinations and VM instances. When the tests are complete, the captured information is stored (e.g., uploaded to an S3 bucket like any other log file) and correlated in time with the other information generated by the tests (316), e.g., command/results and screen shots/video. All or some portion of this correlated data set may then be transmitted to the developer's device for presentation in any of a wide variety of ways (318).

As will be appreciated, there is a great diversity of browser control and information capture enabled by this automated integration with browser dev tools. For example, a developer can specify that a performance check should be conducted in conjunction with the application of a particular command or sequence of commands. The performance information generated by the browser can then be captured for manual review and/or support of a variety of functionalities. In another example, a network request made by the browser could be intercepted and/or the response modified (e.g., by redirecting or specifying a custom response). In another example, network capabilities of the target environment (mobile device or browser) could be emulated. In yet another example, CPU and other platform specific capabilities could be emulated. Information that might be captured includes, network events, application states (e.g., DOM tree), resource usage (e.g., CPU and I/O utilization on mobile devices), page lifecycles (e.g., timings on when something was loaded or intractable), etc. From these example, those of skill in the art will appreciate great diversity of the kinds of control and information capture enabled using a CCS.

Moreover, the rich information set generated using a CCS may be made available to developers after tests across many browser instances are complete. The availability of this data supports correlating specific performance data with test success or failure, and flagging specific correlations to developers. As will be discussed, not only does this enable the behavior of a particular browser or testing resource to be surfaced, it also enables the abstraction of data across many instances.

The browser engines and dev tools APIs for mobile web browsers are similar to those for other computing devices, and so the control and capture functionality described above with reference to traditional (e.g., desktop/laptop) web browsers may be achieved in similar fashion. It should be noted, however, that there may be some cases in which additional measures need to be taken to facilitate the communications. For example, for a Chrome browser running on an Android operating system, the Android Debug Bridge (ADB) connection may need to be multiplexed between Chromedriver and the browser running in the emulator. More generally, and as will be appreciated, a specific browser and operating system combination (whether mobile or not) may require additional measures that are specific to the combination to achieve at least some of the control and capture functionality described herein, but which are within the skill of those in the art.

It should also be noted that access to a browser for the purpose of capturing test-related information may be achieved by mechanisms other than a browser API. For example, a CCS could be configured to interact with a browser in an automated way that mimics the types of interactions that a developer might have with the browser.

Another class of examples of the kinds of information that might be generated using a CCS assumes that the AUT is a native application for a mobile device, that the testing resource of the testing platform is the operating system of an actual hardware mobile device interacting with a VM instance or an emulator of a mobile device operating system on a VM instance, and that the testing framework is an open source framework using Appium. It will be understood however that these assumptions are merely for the purpose of illustration. For example, other approaches might use native libraries such as those associated with Xcode (from Apple) or Android debug bridge (ADB) to capture state information.

In this class of examples, the same basic architecture and work flow illustrated in FIGS. 2 and 3 can be used to capture state information about a native application under test, whether the test resources correspond to an actual hardware mobile device or an emulator. Conventional automated test results can be acquired from the Appium logs. A control/capture service that facilitates generation and capture of a richer data set (e.g., CCS 212) may be implemented using integration tools that enable integration with OS automation engines such as, for example, those provided by Google (for Android) and Apple (for iOS).

Such integration tools and automation engines allow for the translation of test scripts to the lower level functionality of the mobile device OS for execution, and for the capture of detailed information (e.g., from Android or iOS logs) reflecting the state of the device, the OS, and/or the AUT. As will be appreciated, such information might include various types of performance data including processor and/or memory usage data. And as with the class of examples described above relating to web applications, the information captured by this service may be correlated with other information (e.g., Appium test commands and/or results, video, screen shots, etc.) in a way that enables the developer to better understand the state of the AUT, the device OS, and/or allocated testing resources at various points in time as the automated test is performed.

Whether the test being performed relates to a web application, a mobile-web application, or a mobile native application, the captured information may be downloaded by the developer directly for review, and/or parsed by a dedicated service to support a variety of features that may be exposed via the test console interface.

According to various implementations enabled by the present disclosure, machine learning techniques are applied to the problem of unreliable test runs in the context of an automated test platform such as, for example, test platforms implemented as described above. A test is considered unreliable if, for example, neither the AUT nor the test code has changed in any significant way but the test results are inconsistent, e.g., the test passes and fails over successive test runs. Another way to articulate this is that the test is not deterministic. As will be appreciated, this reduces confidence in the automated test results in that it is difficult for the developer to know whether or not a failure should be the basis for a decision to take dramatic action, e.g., stop a current build or delay deployment.

As will be described, machine learning techniques are employed to build and evolve models that enable the classification of test runs (e.g., as unreliable). In some of these implementations, such models may also support identification of the root cause of the unreliability. For example, a particular class or cluster of test runs may have a strong correlation with failures due to infrastructure problems (e.g., networking issues). In another example, another class or cluster of test runs might be characterized by intermittent failure due to the fact that the test code was not written in a way that conforms to best practices. As will be appreciated, many other factors that contribute to test flake may be identified using the techniques described herein.

According to various implementations, information sets are generated for each test run involving the application of the same test code to the same AUT. For implementations in the context of an automated test platform, the platform itself is in a good position to be collecting such information. For example, for tests conducted using web browsers, such a platform may have access to Selenium logs generated in conjunction with the application of Selenium tests. In addition, a test platform that employs a service like the Control/Capture Service (CCS) described above might also have access to other information such as, for example, HTTP archive (HAR) files (JSON-formatted archive files that log information about a web browser's interaction with a site and that include detailed performance data about the web pages it loads), and/or jsconsole files (files that log information such as network requests, JavaScript, CSS, and security errors and warnings, and messages explicitly logged by JavaScript code). Additional data might also be obtained from the developer side of the test runs in a variety of ways, e.g., explicit or implicit feedback in a user interface by which the developer interacts with the test platform. Additional data might also be obtained through integration with the source control system or build automation system that provides information on which application or test files changed from the last test.

Implementations are contemplated in which either or both supervised and unsupervised machine learning techniques may be employed. Supervised learning is a broad class of machine learning in which a classifier learns a function that maps an input to an output based on examples of input/output pairs, i.e., training data. The classifier may be any of a wide variety of classifier types including, for example, a neural network, a support vector machine, a linear regression algorithm, a k-nearest neighbor algorithm, etc.

As will be appreciated, supervised techniques require some kind of labeled "ground truth" which may be derived, for example, by labeling training test runs based on developer feedback or manual review by human operators associated with the test platform. For example, a developer may be provided with options in the user interface to the test platform for providing explicit feedback about specific test runs. This might involve explicit solicitations directed to the developer, e.g., "We think this looks like a new type of failure. Are we right?" Such mechanisms could result in meaningful feedback from developers as to which failures should be considered real and which are ignored or identified as flake. Alternatively, or in addition, implicit feedback may be derived by interpreting a developer's interactions with the platform, e.g., the test runs reviewed by a developer (e.g., as determined based on interactions with the user interface) can be flagged as significant in some way.

For implementations that may not have access to reliably labeled ground truths, any of a variety of unsupervised machine learning techniques and associated models may be used such as, for example, a k-means clustering algorithm, an expectation-maximization clustering algorithm, a mean shift clustering algorithm, a hierarchical clustering algorithm, density-based clustering, grid-based clustering, as well as other clustering algorithms based on neural networks, etc.

According to a particular class of implementations, the identification of unreliable tests is treated as an unsupervised learning problem to which techniques such as dimensionality reduction and clustering are applied to support the detection of anomalous runs. The behavior of a particular test (i.e., the application of specific test code against the same AUT) is modeled over a number of test runs and projected into an n-dimensional space that represents the behavior of the test runs of that test. Subsequent new test runs are then evaluated against that model with any deltas (i.e., significant deviations from the existing model) being used as input for labeling as, for example, a legitimate failure or an ambient level failure of the test.

According to specific implementations, manual review of test runs may be employed to develop heuristics for seeding an initial model. Developer feedback (explicit and/or implicit) may also be used in refining and improving the model.

As will be appreciated, the projection of a test run into the n-dimensional test results space is dependent on how the test run is encoded, e.g., what parts of the automated test log files, HAR files, and/or jsconsole files are used. For example, it might be important to exclude certain types of information that typically vary a lot from test run to test run because that information may introduce variation that is not meaningful into the model. The seeding of an unsupervised model may rely initially on the knowledge and experience of the engineers developing the model. Subsequent refinement of the model may be based on manual review of the way in which test runs were mapped to the test results space. For example, such review might identify a significant difference between test runs that are identified as similar using the model. The parameter associated with that difference might then be eliminated or emphasized differently in the test run representation. It should be noted, such an exploratory data analysis approach may not be necessary for implementations employing supervised learning techniques.

Figure 4:
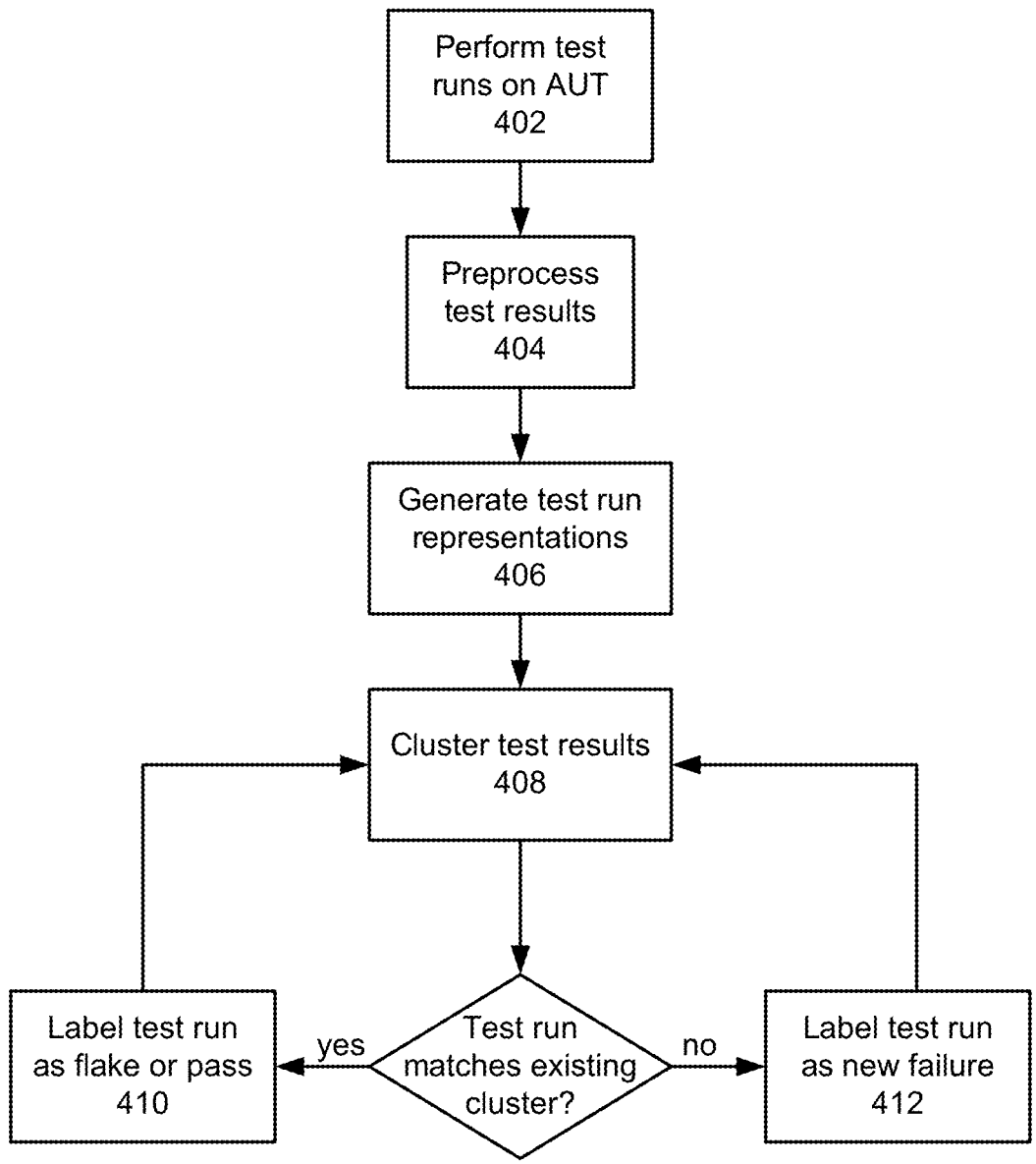
FIG. 4 is a flowchart illustrating operation of another particular implementation.

A particular class of implementations illustrated in FIG. 4 relates to a testing framework that is an open source framework using a Selenium library for the testing of web applications. As discussed above, such a platform may have access to Selenium logs generated in conjunction with the application of Selenium tests (402). A typical Selenium test involves a sequence of actions that are intended to simulate how a human user might interact with a web page and might include commands such as, for example, "go to this URL," "find this element," "click the element," "check this element's attribute," "enter text in this field," etc.

According to this class of implementations, the information in the raw Selenium log is preprocessed by mapping the raw log entries to simpler representations that are more amenable to dimensionality reduction on text features (404). According to a particular implementation, the raw log data are preprocessed using a set of rules that transform the text is to a format that reduces the occurrence of non-deterministic tokens that are likely to vary from one test run to another. One example of this is a configuration map that includes timestamp data around when the session was initialized. Including these timestamps would lead to noise that has nothing to do with the behavior of the test. Other examples include the randomly generated path string of temporary directories, randomly generated element identifiers, continuous variables (e.g., the time each command takes), and so on.

In some implementations, preprocessing of the log data involves summarization to make the data more amenable to text feature dimensionality reduction. For example, a log may include the result of a search for a list of elements in which each element found is identified by a randomly generated identifier. This list may instead be summarized in preprocessing to a token such as "FOUND_8_ELEMENTS" Likewise, a stack trace of a JavaScript exception may be summarized by the message text of the exception. In another example, a response might include something like a large unstructured JavaScript error message that can be mapped to a simpler representation, e.g., "JavaScript exception." The preprocessing of the Selenium log data reduces the noise in the model so that significant differences between test runs can be more accurately identified.

An example of a portion of the raw log data for a Selenium test run is shown in FIG. 5. The Selenium log is a .json file that contains a detailed record of every command issued during the test session, along with initial session configuration details. The preprocessing of these data involves removing the noisy aspects of the log data (e.g., element ids, timestamps, etc.). Table 1 below provides examples of types of Selenium commands and how each is preprocessed in accordance with a particular class of implementations.

TABLE 1

| Selenium Command | Details | How Request Data Are Handled | How Response Data Are Handled |
|---|---|---|---|
| POST/session | Initialization of the test session. Includes configuration of the Selenium session. | | |
| POST timeouts | Sets configuration of a kind of wait. Can be implicit or explicit. | | |
| POST url | Navigate to the current URL | Include the URL that is navigated to | |
| POST execute | Run JavaScript code | Include the selector type and selector string | Log any JavaScript exception returned by Selenium |
| POST element | Selects an element | Include the selector type and selector string | If successful, return ELEMENTID string, e.g., "ELEMENTID" In other cases return exception (Element Not Found) returned by Selenium |
| POST elements | Selects multiple elements | Include the selector type and selector string | If successful, return a string describing how many elements were found, e.g., "FOUND_8_ELEMENTS" In other cases return exception (Element Not Found) returned by Selenium |
| POST <function> | There are dozens of functions in this format which do many things involving changing the state of the app/browser | | If a value is returned it is kept in its raw form |
| GET <function> | Similar to above, but usually returns a value | | The value returned is kept in its raw form |

FIG. 6 shows a preprocessed representation of the Selenium log data of FIG. 5 preprocessed according to the rules in Table 1. The results for the first 11 commands of the test run are shown (as indicated by the index (Idx) numbers). As will be appreciated, the details of the raw data that are not present in this representation are ignored by subsequent automated analysis and processing.

Vector representations are then generated for the test runs (406). According to a particular class of implementations, text or word embedding algorithms are used for generating the vector representations. According to some of these implementations, a text embedding model may be built for each test by building a vocabulary of tokens in the logs for that test and then using that to get the vector representation. According to others of these implementations, a universal log embedder is built on a random sample (e.g., a few thousand) of logs from different tests. Such a model can then embed any arbitrary log.

According to some implementations, dimensionality reduction may be performed on the resulting vector representations to get smaller, more compressed vectors that are easier to cluster and manage. In some cases, text/word embedding and dimensionality reduction may be integrated with each other as in, for example, fastText, a library for learning text/word embeddings created by Facebook's AI Research (FAIR) lab; see https://github.com/facebookresearch/fastText.

Regardless of the approach taken, once the vector representations of the test runs are generated, machine learning techniques are applied to reliably classify the test runs (408) so that subsequent test runs can be reliably identified as passing or test flake (410) (depending on the cluster it fall into), or so that subsequent test runs can be identified as representing a significant difference from prior test runs (412) (it does not match an existing cluster).

It should be noted that the present disclosure enables a process that can be bootstrapped from a single test run without the need for an explicit set of training runs. That is, implementations are contemplated in which a single test run is represented and labeled as described herein. As subsequent test run representations are encountered that are sufficiently similar, they get the same label (e.g., are assigned to the same cluster). So, although understanding the significance of a particular label or cluster may require a larger set of test runs, beginning the process by assigning a label to the representation of a single test run is within the scope of the present disclosure.

An example of a significant difference between test runs might be the number and type of steps involved each test run. For example, a test that usually takes 80 steps might take only 50 for a particular test run, or might take some of the same steps, register an error, and then take different steps.

Other more subtle things can be important. For example, maybe all of the expected commands in a particular test run are included in the log data, but several of them had an associated error message (e.g., "JavaScript exception" or "modal not found") as their responses rather than the expected responses. Such a test run may have continued to completion, but these different responses could be identified as significant.

Response time is an example of another feature that could be useful in modeling test runs. For example, the model could identify different types of commands as "short," "medium," or "long" in terms of the duration of typical response times. Such test runs could then be identified as anomalous when the actual response time departs from the expectation. Alternatively, standard statistical techniques might be used to infer the probability density and look for outliers.

In another example, a HAR file provides information relating to the traffic behind each of the Selenium commands. For example, the command "push this button" might result in multiple javascript calls. The HAR file shows the order in which the calls were issued and the order in which the corresponding responses were received. Similar examples relate to the information in jsconsole files. By selecting the appropriate information from these files, and mapping that information to appropriate representations, meaningful differences between test runs can be reliably determined.

A report for a given customer's or developer's build, i.e., a grouping of all tests run against the same code, typically includes every test run and its pass/fail status. Conventionally, and as described above, the label "fail" may not be a reliable label. However, for implementations enabled by the present disclosure, additional information may be included with the "fail" label that indicates (possibly with an associated confidence value), for example, whether a particular failure is the kind of failure the customer should stop their build for, or whether it can be safely ignored. For example, a machine learning model as described herein can be used to determine how different a particular test run is from previous test runs, and then translate that difference into a score representing how likely the test run is to be unreliable. For example, if a test run represents a large delta from previous test runs, it might be given a high score as a legitimate failure. On the other hand, if a test run falls into an established passing behavior pattern or a consistent failing behavior pattern, the model might score it as not being a legitimate failure.

According to some implementations, differences between test runs may be identified for evaluation as a source of a test run failure. For example, an automated difference comparison might be performed between representations of passing and failing test runs to identify differences between the test runs. Such differences could then be surfaced (e.g., in a system GUI to a developer) as suggested avenues of inquiry in determining the cause of the failure. The comparisons may be performed on, for example, the vector representations of the test runs, the preprocessed log data for the test runs, or even the raw log data for the test runs. In the latter case, the results of the comparison may be cleaned up after the comparison by removal of differences relating to noisy information as described above with reference to the preprocessing of the raw log data. Such difference comparisons may be used to identify differences between test runs in a cluster of passing tests and test runs in a cluster of failing tests. They may also be used to identify differences between a new type of failure and previous test runs (including failing and/or passing test runs).

As discussed above, test "flake" is defined as inconsistent pass/fail behavior when neither the test code nor the AUT has changed. As will be appreciated, there may be circumstances in which a test platform may not have reliable visibility on when such changes occur on the developer's side of things. According to some implementations, a variety of mechanisms may be employed to identify when such changes occur. For example, a change may be identified based on the sequence of Selenium commands for different test runs. Another example involves connecting with a customer's continuous integration system to identify changes. Another example involves identifying changes using a customer's git repositories (a version control system for tracking changes in computer files and coordinating work on those files among multiple people). Another example involves enforcement of test name changes by the test platform. Test code changes may also be reflected in the clustering of test runs, i.e., significant changes in test code may often result in very low correlation among test runs and correspondingly loose clustering. These and other mechanisms known to those in the art can be used in any combination to ensure that test runs are appropriately treated.

Even where visibility into test code changes is limited or non-existent, the techniques described herein may be useful in identifying when the test code changes themselves result in new and/or spurious failure modes. For example, variation can happen because some test code, while otherwise stable, may be parameterized, e.g., testing in different domains (i.e., the domain is a variable). In such cases where the changes to the test code are relatively minor, meaningful clustering of test runs for the different "versions" of the test code may still be performed. So, for example, if different sets of test runs are hitting different servers with different URLs, that could show up in the clustering as a significant difference. The effect of such variable parameters could be reduced or eliminated in the preprocessing of the test run data as described above. On the other hand, it may be useful to surface or emphasize such differences in the clustered test run data. That is, it may be desirable to flag the fact that a parameter changed and that led to a failure, e.g., a failure appears to be correlated with a change in the domain the test commands are hitting.

It will be understood by those skilled in the art that changes in the form and details of the implementations described herein may be made without departing from the scope of this disclosure. For example, although implementations are described in which the clustering and analysis of test run data are intended to be across runs of the same test code, implementations are contemplated in which classifications of failure that are applicable across different test code and/or AUT may be identified based on the test run data. Examples of such classifications might include "Failure due to failed network requests," "Failure due to JavaScript exception," "Failure due to missing element required to complete test," etc. The scope of the disclosure should therefore not be limited by reference to these aspects of such implementations.

It will also be understood that the clustering of test runs and the identification of test flake and/or new modes of failure may be an iterative, incremental process in which training and evolution of the underlying models is ongoing. As such, a given test run may be considered to be both training data as well as input for run-time classification. Therefore, the scope of the present disclosure should not be limited by reference to the use of the term "training" to describe particular test runs or their representations.

Finally, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method, comprising:
performing a plurality of training test runs for an application under test (AUT), each training, test run involving execution of test code against a corresponding instance of the AUT, each training test run resulting in corresponding training test results;
simplifying the training test results for each training test run by removing noisy information from the training test results;
generating a training test run representation implemented as a vector representation for each of the training test runs using the corresponding simplified training test results;
performing dimensionality reduction on the training test run representations implemented as vector representations;
clustering the training test run representations into a plurality of test run clusters;
identifying each of a subset of the test run clusters as representing training test runs exhibiting inconsistent failure behavior in which successive test runs using a same AUT and a same test code result in one or more passes and one or more fails;
performing a first test run for the AUT by executing the test code against a corresponding instance of the AUT, thereby generating first test results;
simplifying the first test results by removing noisy information from the first test results;
generating a first test run representation implemented as a vector representation using the simplified first test results;
determining that the first test run representation corresponds to a first one of the subset of test run clusters;
identifying one or more differences between the first test run representation and one or more previous test run representations by comparing respective vector representations implementing the first test run representation and the one or more previous test run representations;
quantifying the one or more differences;
translating the quantified one or more differences to a representation of how likely the first test run is reliable or unreliable; and
labeling the first test run with a reliability label indicating the representation of how likely the first test run is reliable or unreliable.

2. The method of claim 1, wherein the clustering of the training test run representations is done using an unsupervised learning technique.

3. The method of claim 1, further comprising associating one of a plurality of labels with each of the training test run representations, wherein the clustering of the training test run representations is done using the labels and a supervised learning technique.

4. The method of claim 3, further comprising:
transmitting representations of the training test results to a remote developer device for presentation in a user interface of the remote developer device; and
receiving feedback from the remote developer device, the feedback being generated using the user interface and relating to the training test results;
wherein associating the labels with the training test run representations is done based on the feedback.

5. The method of claim 1, wherein the AUT is a web application, wherein each of the first and training test runs involves interaction of a web browser with the corresponding instance of the AUT as controlled by the test code using a web application automation driver, and wherein each of the first and training test results corresponds to a test log representing application of test commands of the test code using the web application automation driver.

6. The method of claim 1, wherein the AUT is a native application configured to operate with a mobile device operating system (OS), wherein each of the first and training test runs involves interaction of the test code with the corresponding instance of the AUT using a mobile device automation driver, and wherein each of the first and training test results corresponds to a test log representing application of test commands of the test code using the mobile device automation driver.

7. The method of claim 1, wherein each of the first and training test results includes state information for the corresponding test run, the method further comprising collecting the state information for each of the first and training test runs using a control/capture service (CCS) that is independent of the test code, the state information for each test run representing one or more states associated with one or more testing resources allocated for the test run.

8. The method of claim 7, wherein the AUT is a web application, wherein each of the first and training test runs involves interaction of a web browser with the corresponding instance of the AUT as controlled by the test code, wherein the state information includes a state of the web browser, and wherein the CCS is configured to apply control commands to the web browser and to receive the state of the web browser from the web browser via an application programming interface associated with the web browser.

9. The method of claim 7, wherein the AUT is a native application configured to operate with a mobile device operating system (OS), wherein each of the first and training test runs involves interaction of the test code with the corresponding instance of the AUT, and wherein the state information includes one or more of a state of the native application, a state of the mobile device OS, or a state of an emulator emulating the mobile device OS.

10. The method of claim 1, further comprising, for each of the first and training test runs:
receiving a request for initiation of the test run;
allocating one or more resources for the test run, the one or more resources including a virtual computing environment (VCE) instance;
establishing a communication link between the VCE instance and the corresponding instance of the AUT;
receiving a plurality of test commands resulting from execution of the test code;
applying the test commands to the corresponding instance of the AUT using the VCE instance and the communication link;
receiving the test results for the test run with the VCE instance via the communication link;
correlating the test commands and the test results thereby generating a correlated data set; and
storing the correlated data set.

11. The method of claim 1, further comprising:
performing a second test run for the AUT by executing the test code against a corresponding instance of the AUT, thereby generating second test results;
simplifying the second test results by removing noisy information from the second test results;
generating a second test run representation using the simplified second test results;
determining that the second test run representation does not correspond to any of the test run clusters; and
labeling the second test run as a new type of failure.

12. The method of claim 1, further comprising:
performing a second test run for the AUT by executing the test code against a corresponding instance of the AUT, thereby generating second test results;
simplifying the second test results by removing noisy information from the second test results;
generating a second test run representation using the simplified second test results;
determining that the second test run representation does not correspond to any of the test run clusters; and
forming a new cluster including the second test run representation.

13. A system, comprising one or more computing devices comprising:
a memory device; and
one or more processors in communication with the memory device, the one or more processors configured to:
perform a plurality of training test runs for an application under test (AUT), each training test run involving execution of test code against a corresponding instance of the AUT, wherein, for each of the training test runs, the one or more processors are configured to:
allocate one or more resources for the training test run, the one or more resources including a virtual computing environment (VCE) instance;
establish a communication link between the VCE instance and the corresponding instance of the AUT;
receive a plurality of test commands resulting from execution of the test code;
apply the test commands to the corresponding instance of the AUT using the VCE instance and the communication link;
receive training test results for the training test run with the VCE instance via the communication link;
generate a training test run representation implemented as a vector representation for each of the training test runs;
perform dimensionality reduction on the training test run representations implemented as vector representations;
cluster the training test run representations into a plurality of test run clusters;
identify each of a subset of the test run clusters as representing training test runs exhibiting inconsistent failure behavior;
perform a first test run for the AUT by executing the test code against a corresponding instance of the AUT, thereby generating first test results;
generate a first test run representation implemented as a vector representation using the first test results;
determine that the first test run representation corresponds to a first one of the subset of test run clusters;
identify one or more differences between the first test run representation and one or more previous test run representations by comparing respective vector representations implementing the first test run representation and the one or more previous test run representations;
quantify the one or more differences;
translate the quantified one or more differences to a representation of how likely the first test run is reliable or unreliable; and
label the first test run with a reliability label indicating the representation of how likely the first test run is reliable or unreliable.

14. The system of claim 13, wherein the one or more processors are configured to cluster of the training test run representations using an unsupervised learning technique.

15. The system of claim 13, wherein the one or more processors are further configured to associate one of a plurality of labels with each of the training test run representations, and wherein the one or more processors are configured to cluster the training test run representations using the labels and a supervised learning technique.

16. The system of claim 15, wherein the one or more processors are further configured to:
transmit representations of the training test results to a remote developer device for presentation in a user interface of the remote developer device; and
receive feedback from the remote developer device, the feedback being generated using the user interface and relating to the training test results;
wherein the one or more processors are configured to associate the labels with the training test run representations based on the feedback.

17. The system of claim 13, wherein the AUT is a web application, wherein each of the first and training test runs involves interaction of a web browser with the corresponding instance of the AUT as controlled by the test code using a web application automation driver, and wherein each of the first and training test results corresponds to a test log representing application of test commands of the test code using the web application automation driver.

18. The system of claim 13, wherein the AUT is a native application configured to operate with a mobile device operating system (OS), wherein each of the first and training test runs involves interaction of the test code with the corresponding instance of the AUT using a mobile device automation driver, and wherein each of the first and training test results corresponds to a test log representing application of test commands of the test code using the mobile device automation driver.

19. The system of claim 13, wherein each of the first and training test results includes state information for the corresponding test run, and wherein the one or more processors are further configured to collect the state information for each of the first and training test runs using a control/capture service (CCS) that is independent of the test code, the state information for each test run representing one or more states associated with one or more testing resources allocated for the test run.

20. The system of claim 19, wherein the AUT is a web application, wherein each of the first and training test runs involves interaction of a web browser with the corresponding instance of the AUT as controlled by the test code, wherein the state information includes a state of the web browser, and wherein the CCS is configured to apply control commands to the web browser and to receive the state of the web browser from the web browser via an application programming interface associated with the web browser.

21. The system of claim 19, wherein the AUT is a native application configured to operate with a mobile device operating system (OS), wherein each of the first and training test runs involves interaction of the test code with the corresponding instance of the AUT, and wherein the state information includes one or more of a state of the native application, a state of the mobile device OS, or a state of an emulator emulating the mobile device OS.

22. The system of claim 13, wherein the one or more processors are further configured to:
perform a second test run for the AUT by executing the test code against a corresponding instance of the AUT, thereby generating second test results;
generate a second test run representation using the second test results;
determine that the second test run representation does not correspond to any of the test run clusters; and
label the second test run as a new type of failure.

23. The system of claim 13, wherein the one or more processors are further configured to:
perform a second test run for the AUT by executing the test code against a corresponding instance of the AUT, thereby generating second test results;
simplify the second test results by removing noisy information from the second test results;
generate a second test run representation using the simplified second test results;
determine that the second test run representation does not correspond to any of the test run clusters; and
form a new cluster including the second test run representation.

24. A computer program product, comprising one or more non-transitory computer-readable media having computer program instructions stored therein, the computer program instructions being configured such that, when executed by one or more processors, the computer program instructions cause the one or more processors to:
perform a plurality of training test runs for an application under test (AUT), each training test run involving execution of test code against a corresponding instance of the AUT, each training test run resulting in corresponding training test results;
generate a training test run representation implemented as a vector representation for each of the training test runs;
perform dimensionality reduction on the training test run representations implemented as vector representations;
cluster the training test run representations into a plurality of test run clusters;
identify each of a subset of the test run clusters as representing training test runs exhibiting inconsistent failure behavior;
perform a first test run for the AUT by executing the test code against a corresponding instance of the AUT, thereby generating first test results;
generate a first test run representation implemented as a vector representation using the first test results;
determine that the first test run representation corresponds to a first one of the subset of test run clusters;
identify one or more differences between the first test run representation and one or more previous test run representations by comparing respective vector representations implementing the first test run representation and the one or more previous test run representations;
quantify the one or more differences;
translate the quantified one or more differences to a representation of how likely the first test run is reliable or unreliable; and
label the first test run with a reliability label indicating the representation of how likely the first test run is reliable or unreliable;
perform a second test run for the AUT by executing the test code against a corresponding instance of the AUT, thereby generating second test results;
generate a second test run representation using the second test results;
determine that the second test run representation does not correspond to any of the test run clusters; and
label the second test run as a new type of failure.

\* \* \* \* \*